No. 636,679. Patented Nov. 7, 1899.
J. H. MICHELSEN.
ORE CONCENTRATING MACHINE.
(Application filed June 19, 1899.)
(No Model.) 2 Sheets—Sheet 1.
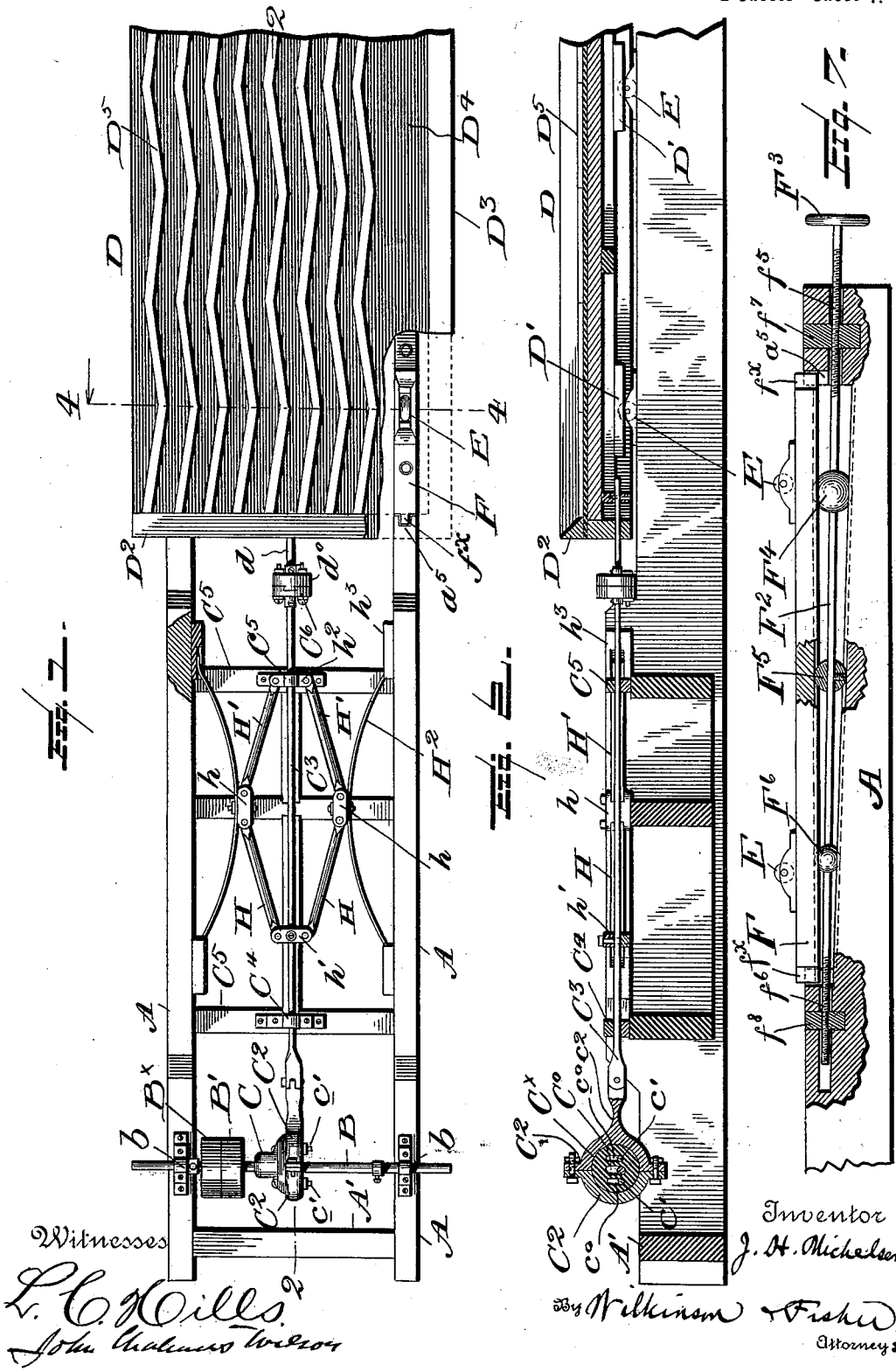

No. 636,679. Patented Nov. 7, 1899.
J. H. MICHELSEN.
ORE CONCENTRATING MACHINE.
(Application filed June 19, 1899.)
(No Model.) 2 Sheets—Sheet 2.
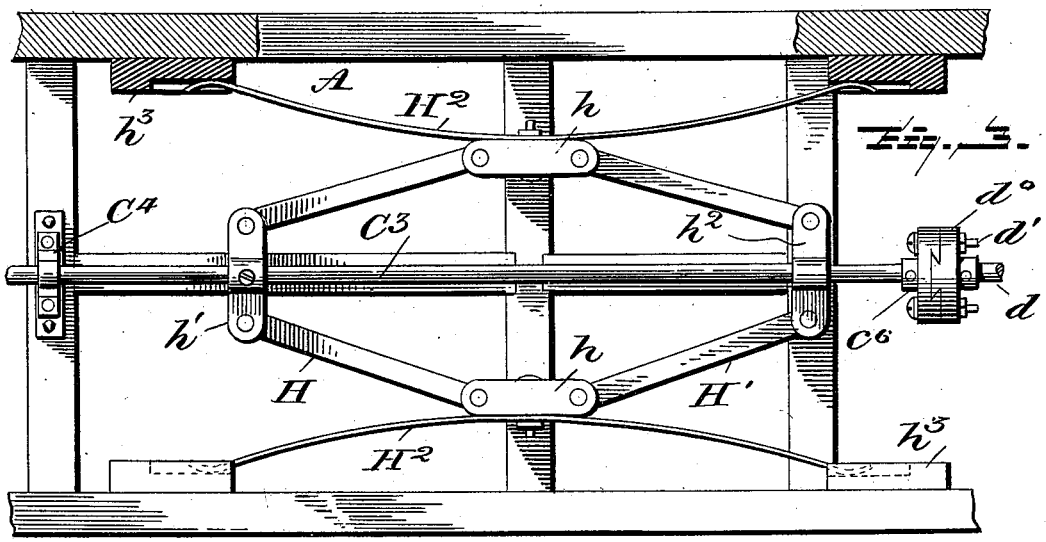
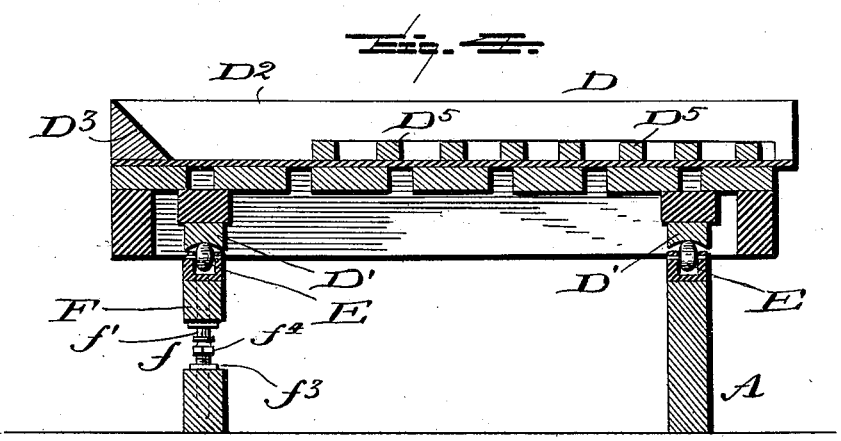
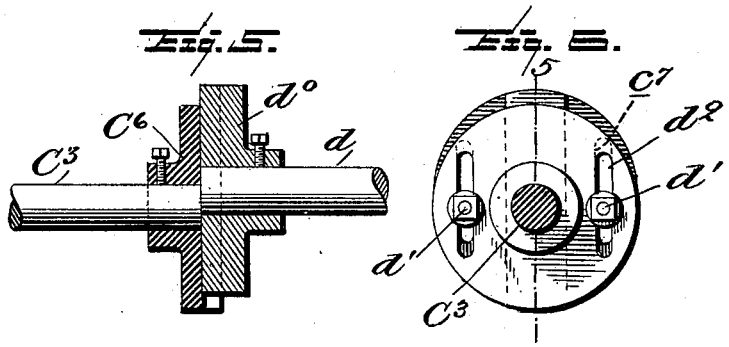

UNITED STATES PATENT OFFICE.

JOHN H. MICHELSEN, OF BUTTE, MONTANA.

ORE-CONCENTRATING MACHINE.

SPECIFICATION forming part of Letters Patent No. 636,679, dated November 7, 1899.

Application filed June 19, 1899. Serial No. 721,123. (No model.)

*To all whom it may concern:*

Be it known that I, JOHN H. MICHELSEN, a citizen of the United States, residing at Butte, in the county of Silver Bow and State of Montana, have invented certain new and useful Improvements in Ore-Concentrating Machines; and I do hereby declare the following to be a full, clear, and exact description of the invention, such as will enable others skilled in the art to which it appertains to make and use the same.

My invention relates to improvements in ore-concentrators, and has for its object to provide a concentrator which will have a better action than similar machines now ordinarily in use, and it will thus produce better results.

My invention consists in the novel features hereinafter described and claimed.

Reference is had to the accompanying drawings, wherein the same parts are indicated by the same letters throughout the several views.

Figure 1 represents a top plan view of my improved ore-concentrator, parts being broken away for the sake of better illustration. Fig. 2 is a central longitudinal section of the same, taken on the line 2 2 in Fig. 1. Fig. 3 is an enlarged fragmentary view of that portion of the operating mechanism hereinafter known as the "governor," which takes up the lost motion and renders the vibration more smooth. Fig. 4 is an enlarged vertical section taken on the line 4 4 in Fig. 1, looking in the direction of the arrow. Fig. 5 is a section taken on the line 5 5 in Fig. 6. Fig. 6 is an enlarged detail elevation of the adjustable pitman connection; and Fig. 7 is a detail view, partly in section, showing a modification of the means for adjusting the inclination of the table.

The machine comprises a stationary frame made up of side timbers A, rigidly connected by cross-timbers near their ends, as seen at A', the rear portion of the frame being broken away, and therefore the cross-timber at the rear end not being seen in the drawings.

A driving-shaft B is journaled transversely of the side beams A in suitable journal-bearings $b$ and is fitted with fast and loose pulleys B' and $B^\times$, respectively, for a driving-belt from any suitable source of power. It will be understood, however, that a sprocket gear and chain might be substituted for the pulley-and-belt arrangement if desired.

C represents a collar keyed upon the shaft B, and to this collar C is connected an eccentric $C^\times$, the said eccentric being provided with a central elongated slot $C^0$, which fits over the driving-shaft B, and two other slots $c^0$ nearer the periphery of the said eccentric and upon opposite sides of and parallel with the central slot $C^0$. The slots $c^0$ are for the passage of bolts $c'$, which pass closely through axial openings in the collar C and through the said slots $c^0$ in the eccentric, the said bolts being adjustable in the slots $c^0$ for varying the throw of the eccentric, which is done by adjusting the said bolts.

$C^2$ represents an eccentric-strap formed of two sections, which are bolted together upon the said eccentric and in which the said eccentric rotates. One member of this eccentric-strap has attached thereto or formed integral therewith an arm $c^2$, to which is pivoted the pitman-rod $C^3$. This pitman-rod extends longitudinally of the frame and passes through bearing-blocks $c^4$ and $c^5$ upon cross-timbers $C^4$ and $C^5$, mounted rigidly at their ends upon the side timbers A. At its rear end this pitman-rod is connected to a rod upon the concentrating-table D, hereinafter described, and the connection between the pitman-rod $C^3$ and this connecting-rod $d$ is made adjustable to suit varying elevations of the table D by the following means: Upon one of these rods, such as $C^3$, is mounted a flanged collar $c^6$, which is provided with a dovetailed radial groove upon its face, and the other rod $d$ is provided with a similarly-flanged collar $d^0$, which is provided upon its face with a radial dovetailed rib, so that the two collars may be interlocked either in a concentric or eccentric relation, as desired. The two collars are secured together by means of bolts $d'$, which pass through slots $d^2$ and $c^7$ in the collars $d^0$ and $c^6$, respectively, and allow of considerable range of vertical adjustment of the rod $d$ with respect to the rod $C^3$, as seen most clearly in Figs. 5 and 6.

The table D, to which a rapid vibratory motion is given through the devices hereinbefore described, is provided on its under side with a plurality of concave tracks D' near its side edges, as seen most clearly in Figs. 2 and 4, and these concave tracks D' rest upon rollers E, journaled upon the side members of the supporting-frame. The set of rollers at one side of the frame corresponding to the side toward which the table is more or less inclined when in use are mounted in immovable bearings, while that set of rollers upon the opposite side of the frame corresponding to the side of the table from which the inclination is given are mounted upon a movable timber F, which is made vertically adjustable by being mounted upon screw-threaded supporting-pins $f$, which pins have an angular boss $f^4$ for engagement of a wrench, smooth stems $f^2$ to turn freely in the openings therefor in the beam F, and screw-threaded stems $f^2$ to engage similarly-screw-threaded nuts $f^3$, mounted upon the side timber, as seen in Fig. 4, or instead of the supporting-pins $f$, as described, I may use such an adjusting means as is shown in Fig. 7, consisting of a long rod $F^2$, arranged longitudinally of the frame, having screw-threaded portions $f^5$ and $f^6$, engaging tapped plates $f^7$ and $f^8$, set in the frame-timber and provided with a hand-wheel $F^3$ for turning. The side timber is cut away for the reception of the beam F, which also is provided at its ends with tongues $f^\times$, engaging in vertical grooves $a^5$ in the said side member. The bottom of the recess in the side timber is made with an inclination, as seen at $f^9$ in Fig. 4, and a plurality of balls $F^4$, $F^5$, and $F^6$ of graduated size rigidly mounted at proper intervals upon the rod $F^2$ to maintain the beam F always at a level, support the said beam F, and as the said rod is adjusted by rotating the hand-wheel $F^3$ said balls are moved up or down the inclined surface $f^9$, raising or lowering the beam F accordingly.

The concentrating-table is provided with a beveled flange $D^2$ at one end and a similarly-beveled flange $D^3$ at its "upper" side, as seen in Fig. 1. The table has a surface provided with a number of narrow and shallow grooves, as seen at $D^4$, and also has a number of parallel zigzag strips $D^5$ fixed thereon. The motion given to this table through the pitman $C^3$, operated by the eccentric $C^\times$ upon the driving-shaft B, is a very short quick vibration, and without any additional means would be so jerky as to be objectionable in operation. To avoid this objection, I have provided means for taking up all lost motion of the pitman and for causing the same to impart a smooth vibratory motion to the table. This means consists of what I term the "governor," which comprises two sets of toggle-levers H and H', which are pivoted at their adjacent ends to common blocks $h$, and the one set H being pivoted to a block $h'$, affixed upon the pitman-rod $C^3$, while the other set H' is pivoted to a stationary block $h^2$, rigidly mounted upon the cross-beam $C^5$, which forms a rigid part of the frame of the machine. Thus it will be seen that as the pitman-rod $C^3$ oscillates the block $h'$, to which the toggle-levers H are pivoted, will be moved toward the stationary block $h^2$, which movement causes an expansion of the blocks $h$. Semi-elliptical springs $H^2$, bearing at their ends in confining-blocks $h^3$ upon the side beams A of the machine, are secured to the outer sides of the blocks $h$ under compression, so as to exert a constant inward pressure upon the toggle-levers, which is imparted to the pitman-rod, causing all lost motion between the eccentric upon the driving-shaft and the concentrating-table to be taken up.

Having thus described my invention, what I claim, and desire to secure by Letters Patent of the United States, is—

1. In an ore-concentrator, the combination with a vibrating table, roller-bearings for supporting the same; means for raising said rollers under one side of said table; of a pitman provided with a vertically-adjustable connection to said table and also provided with a pair of toggle-levers upon each side, said levers being pressed inward by curved springs, one end of said toggle-levers being connected to the pitman and the other upon the frame of the machine; and an eccentric connected to said pitman provided with means for varying the movement of said pitman, substantially as described.

2. In an ore-concentrator, the combination with a vibratory table adapted to be tilted toward one side, a pitman adjustably connected thereto and provided with bearings, toggle-levers interposed between said pitman and a portion of the frame of the machine provided with springs tending to retain the said toggle-levers extended, said springs being provided with bearing-blocks upon said frame; of a driving-shaft having rigidly mounted thereon a flanged collar, and a circular slotted disk adjustably secured to said collar, the said disk being surrounded by an eccentric-strap, said strap being connected to one end of said pitman, substantially as described.

3. In an ore-concentrator, the combination with a vibratory table adapted to be tilted to one side, and a pitman provided with means for adjusting the throw of said table and means for taking up lost motion; of a connection between said table and said pitman composed of a flanged slotted collar rigidly secured to the end of said pitman provided with a dovetailed groove of uniform width, extending transversely across said collar, and a similar slotted collar rigidly mounted upon a portion of said table, but provided with a dovetailed tongue of uniform width extending transversely of said collar adapted to slide in the grooved portion upon the other collar, and said slots upon both coinciding, bolts passing through the said slots to secure the said collars together, substantially as described.

4. In an ore-concentrator, the combination with a pitman; and a block fixed thereon; of toggle connections between the block on said pitman and a fixed portion of the machine, said toggle connections being oppositely disposed to each other; flat springs secured to said toggles and acting in opposite directions thereon; and recessed blocks receiving and forming bearings for the ends of said springs, substantially as described.

In testimony whereof I affix my signature in presence of two witnesses.

JOHN H. MICHELSEN.

Witnesses:
J. E. McNALLY,
A. T. McCULLOUGH.